May 26, 1936.  A. H. LAMB  2,042,109
ELECTRICAL RELAY
Filed Nov. 17, 1933  2 Sheets-Sheet 1

Inventor:
Anthony H. Lamb,
By Potter, Pierce & Scheffler,
Attorneys.

May 26, 1936.  A. H. LAMB  2,042,109
ELECTRICAL RELAY
Filed Nov. 17, 1933  2 Sheets-Sheet 2

Inventor:
Anthony H. Lamb,
By Potter, Pierce & Scheffler,
Attorneys.

Patented May 26, 1936

2,042,109

UNITED STATES PATENT OFFICE 2,042,109

ELECTRICAL RELAY

Anthony H. Lamb, Elizabeth, N. J., assignor to Weston Electrical Instrument Corporation, Newark, N. J., a corporation of New Jersey Application November 17, 1933, Serial No. 698,531

13 Claims. (Cl. 175—320)

This invention relates to electrical relays and more particularly to relays for use with devices, such as photoelectric cells, thermocouples and the like, which have a relatively small electrical output.

The known systems for actuating recorders and control systems from devices of small current output usually include a sensitive or instrument type relay controlled by the device, and a more rugged or secondary relay which is controlled by the sensitive relay. This serial arrangement of relays is necessary whenever the torque developed by the output of the initial control device is not sufficient to actuate the ultimate control element which may be, and frequently is, a switch or set of contacts in a load circuit.

An object of the present invention is to provide a simplified and compact relay which may be actuated by a relatively small current flow.

An object is to provide a relay having a single moving system which includes a pair of windings, one winding being adapted for connection to an electrical device of low output to initiate movement of the moving system to close a circuit to the second winding, and the second winding being a "power" winding for completing the movement to control a set or sets of load circuit contacts.

A further object is to provide a combined sensitive and power relay construction including toggle switch mechanism which reduces the current drain of the relay to a minimum and which prevents chattering of the load circuit contacts.

Figure 1:
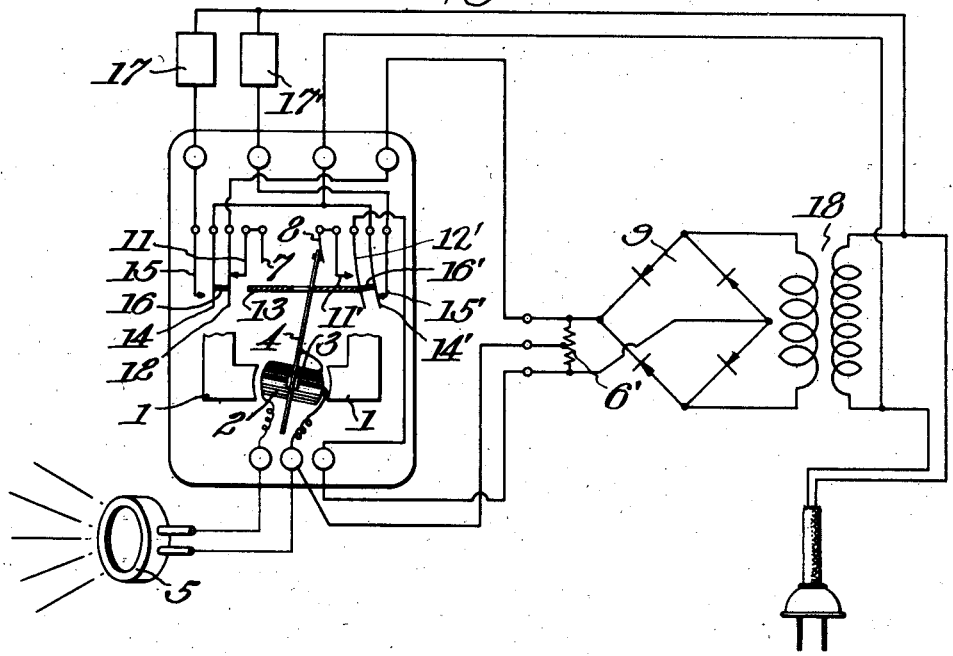
Figure 2:
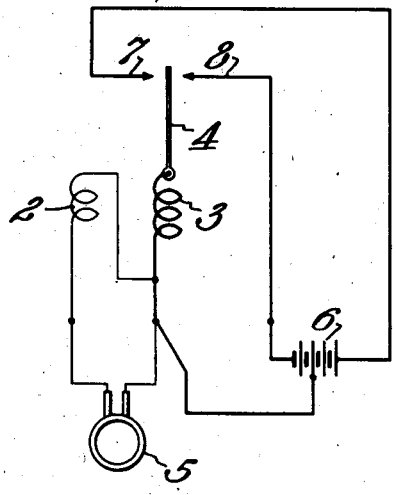
Figure 3:
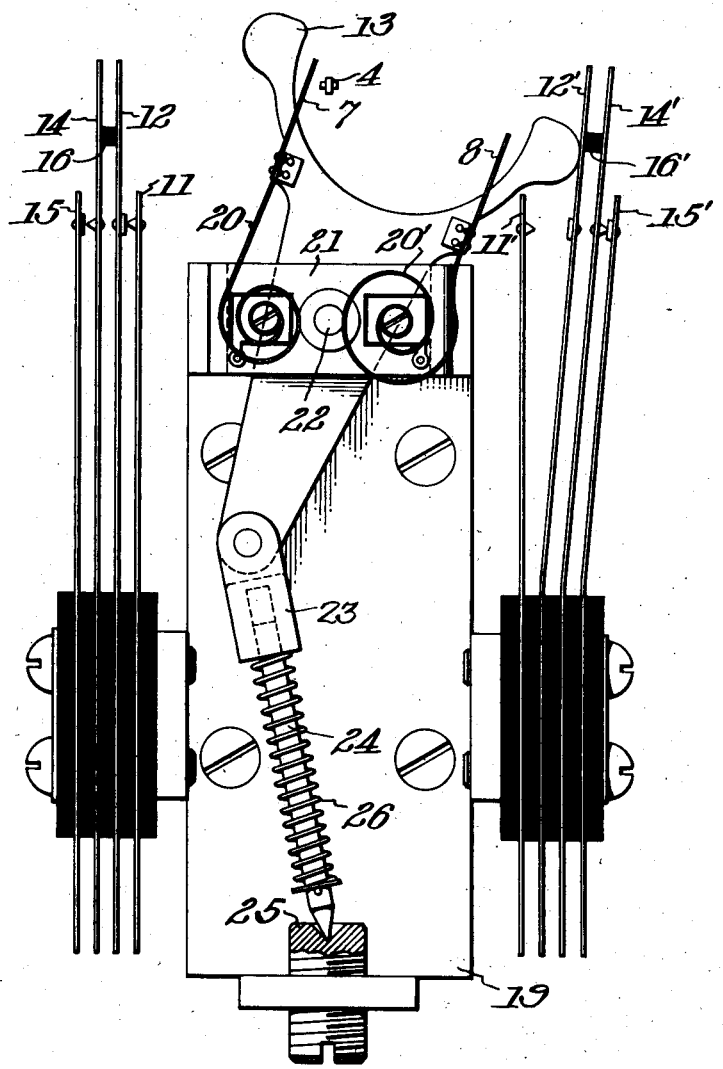

These and other objects and advantages of the invention will be apparent from the following specification when taken with the accompanying drawings, in which, Fig. 1 is a circuit diagram of an embodiment of the invention, Fig. 2 is a simplified diagram showing the essential circuit connections of the sensitive and power windings of the relay, and Fig. 3 is an elevation of a preferred form of toggle switch mechanism for inclusion in a relay circuit such as shown in Fig. 1.

In the drawings, the reference numeral 1 identifies the opposed poles of a permanent magnet between which is mounted a moving system comprising the pair of windings 2, 3 and a contact arm 4. The winding 2 will be designated, for convenience of description as the "sensitive winding" since it is adapted to be connected across a device 5, such as the photoelectric cell, to initiate the operation of the moving system in response to the relatively small current output of the cell. Winding 3 may be termed the "power winding" as it may be subjected to relatively heavy current flow when the contact arm 4 completes an energizing circuit for the power winding. The initial displacement of the moving system is effected by the sensitive winding, in accordance with the output of the initial control device 5, and the final displacement is effected by the power winding which develops sufficient torque to actuate load circuit switches or other appropriate control devices. This difference in the relative magnitudes of the current flow in the two windings is indicated graphically by the lighter lines which illustrate the circuit connections of winding 2 and the control device 5.

The general method of operation of the combined sensitive and power relay system may be best understood by reference to Fig. 2 which illustrates only the essential circuits of the two windings. The power winding 3 is connected between the center tap on a current source 6, such as a battery, and the contact arm 4; the opposite terminals of the source 6 being connected to the contacts 7, 8, respectively, through switches which are omitted from this schematic view but which are illustrated in Figs. 1 and 3. As the moving system is actuated by current flow in the sensitive winding 2 to move contact arm 4 into engagement with contact 7 or 8, a circuit is completed through the power winding 3 and the moving system then develops a torque of a substantially greater magnitude than that due to current flow in the sensitive winding. The sense of the windings and the circuit connections are such that the torque developed by the power winding upon a closure of the contact arm 4 with either contact is in the same direction as the torque which effects the closure of the contacts.

Reverting to the Fig. 1 diagram which illustrates a rectifier bridge 9 and center tapped resistance 6' as the current source for the power winding 3, it will be noted that the contacts 7, 8 are not connected directly to the terminals of the resistance 6' but to the inner contacts 11, 11' of a pair of multiple blade switches which are preferably of the type commonly used in telephone jacks. The next blades 12, 12' of the respective switches are connected to the opposite terminals of the current source or resistance 6'. The contact arm 4 moves an insulating block or switch operator 13 against the respective blades 12, 12' when the power winding 3 is energized by the engagement of contact arm 4 with contact 7 or 8, respectively, and the resultant displacement of blade 12 or 12' opens the power winding circuit at contacts 11, 12 or 11', 12'. The advantage of this system over the essential circuit arrangement shown in Fig. 2 is that when the switch operator 13 is yieldingly retained in each of its end positions (as will be explained hereinafter) momentary current impulses actuate the moving system of the relay to its alternate positions and a continuous drain on the current source is avoided. Chattering of the switch operator 13 is impossible since successive energizations of the power winding 3 occur only when the current output of the initial control device 5 varies between the two limits corresponding to engagement of contact arm 4 with the respective contacts 7, 8.

As shown in Fig. 1, load circuit switches comprising pairs of contacts 14, 15 and 14', 15', are arranged for actuation by member 13 through the intermediary of the blades 12, 12' which are connected to contact blades 14, 14' by the usual insulating plugs 16, 16'. The circuits in which the contacts 14, 15 and/or 14', 15' are included may be of any desired nature in accordance with the particular control, signal or recording device which is to be actuated by the initial control element 5. In the circuit diagram the loads are indicated by the block elements 17, 17' and may be audible or visual signals, the operating windings of counting devices, banks of lights, solenoids for actuating valves or other control elements, the reversing windings of a motor, or any other appropriate or desired load devices. As illustrated, the adjacent terminals of the load elements 17, 17' are both connected to one terminal of a suitable current source such as one side of the alternating current line which feeds the primary winding of the transformer 18, that has a secondary across which the rectifier bridge 9 is connected. The other side of the line is connected to the contact blades 14, 14' and when, as shown, the contacts 14, 15 and 14', 15' are normally open, current is supplied to the load 17 or 17' when the switch operator 13 is moved to the left or the right, respectively, in accordance with the current output of the initial control device 5.

It will be apparent that only one load circuit switch is required for certain control or signal systems and that one set of contacts 14, 15 or 14', 15' may therefore be omitted in some instances. The relay system may be employed, for example, to energize navigation, traffic or aeroplane landing field lights at night when the illumination at a photocell 5 falls to such value that contact arm 4 engages contact 7. In such a system the load 17 comprises one or more lamps and only the switch contacts 14, 15 are required.

A convenient and practical form of switch structure for use in the Fig. 1 circuit is shown in Fig. 3. The switch operating member 13 takes the form of a notched lever of insulating material which is pivotally mounted on a plate 19 in such position that the contact arm 4 of the moving system of the relay is within the notch of the lever. Except that the moving system is provided with both a sensitive winding 2 and power winding 3, the exact construction of the relay may be varied within wide limits in accordance with design requirements. The contacts 7, 8 are resilient strips mounted upon the lever 13 and having a normal spacing somewhat less than the width of the notch in the lever. Connections are made to contacts 7, 8 by flexible conductors, such as the spring strips 20, 20' which are mounted on and insulated from a yoke 21 which is spaced from the plate 19 to provide one bearing for the pin 22 by which the lever 13 is pivotally mounted on plate 19. A member 23 is pivoted to the lower end of lever 13 and telescopingly receives the rod 24 which has its lower pointed end mounted in a bearing 25 that is threaded into a flange on the plate 19. A coiled spring 26 surrounds the rod 24 and tends to retain the lever 13 in either of its extreme positions, the rod 24 and lower end of lever 13 forming a toggle mechanism which passes through dead center as the lever 13 moves between its alternate limiting positions.

The parts are so proportioned that the upper edges of the lever 13 engage the contact blades 12, 12' to actuate the opposed multiple blade switches, and the toggle action results in a quick movement of the switch mechanism when the operating winding 3 is energized upon the engagement of contact arm 4 with either contact 7 or 8.

While I have described an embodiment of the invention in which the power winding actuates the member 13 to control switches in one or more load circuits, it will be apparent that the member 13 may mechanically operate other types of control devices, such for example as valves, visible signals or the like. Furthermore, mechanical equivalents of a toggle mechanism may be employed to yieldingly retain the operator 13 in its extreme positions when it is desirable to avoid chattering of the load switches or other controlled elements. A toggle mechanism will usually be the preferred type of construction since the mechanism is exceedingly simple and may include an adjustable element, such as the bearing 25, for regulating the force exerted by the spring 26.

It is apparent that various changes may be made in the circuit arrangements and the design, the relative size and shape of the several physical elements without departure from the spirit of my invention as set forth in the following claims.

I claim:

1. An electrically operated relay system of the type including a sensitive winding adapted to develop a low torque to close a set of contacts in the energizing circuit of a power winding, and a control member actuated by current flow in said power winding; characterized by the fact that said control member actuates one contact of said set of contacts, and said sensitive winding constitutes means for initiating the movement of said control member to close said set of contacts, thereby energizing said power winding to effect a further movement of said control member.

2. In an electrical relay, the combination with a magnetic system including relatively moving members, a set of contacts adapted to be closed by an initial relative movement of said members, and a sensitive winding for effecting said initial relative movement of said members when subjected to a predetermined flow of current, of a power winding for effecting a further relative movement of said members, and control means actuated by said further relative movement, the said set of contacts being adapted to be included in the energizing circuit of said power winding.

3. In an electrical relay, the combination with a magnet, and a moving system including a contact arm and a pair of windings, one winding being a sensitive winding for initiating the displacement of the moving system and the other a power winding for effecting a further displacement of the moving system, a pair of contacts between which said contact arm is movable in response to current flow in said sensitive winding, circuit connections including said contact arm and contacts adapted to complete a pair of energizing circuits for said power winding, and control means actuated by the displacement of said moving system resulting from current flow in said power winding.

4. In a relay system, a magnet having spaced poles, a moving system pivotally mounted in the gap between said poles, a sensitive winding included in said moving system for initiating movement thereof, a power winding on said moving system for effecting further movement thereof in the direction initiated by said sensitive winding, means operable upon an initial movement of said moving system to energize said power winding, and control means actuated by the said additional movement effected by said power winding.

5. In a relay system, a magnet having spaced poles, a moving system pivotally mounted between said poles and including a contact arm and a pair of windings, one winding being a sensitive winding and the other a power winding, a movable operator element, and contacts on said element adapted to be engaged by said contact arm to complete alternative energizing circuits for said *power winding, said operating element being movable by said contact arm upon energization of said power winding to break the engagement of said contact arm with the contact which completed a circuit through said power winding.

6. A relay system as claimed in claim 5, wherein said operator element comprises a pivoted lever, in combination with means cooperating with said lever to form a toggle linkage, and spring means yieldingly retaining said lever in the position into which it was last moved by an energization of said power winding.

7. In a relay system, a magnet and a moving system including an arm and a winding for moving said arm between alternate end positions, a pivoted lever having a notch into which said arm extends for moving said lever, means for yieldingly restraining said lever from movement out of each of said alternate end positions, and a pair of spaced contacts positioned within the path of movement of said arm within said notch for completing an energizing circuit for said winding, said moving system including means for moving said arm alternatively into engagement with said contacts.

8. A relay system as claimed in claim 7, wherein said contacts are positioned adjacent the respective edges of the notch, said contacts being supported on said lever and alternately moved out of the path of said arm as the lever is tilted in opposite directions by said arm.

9. In a relay system, the combination with a magnet and a moving system, said system including a pair of windings and a contact arm movable between a pair of spaced contacts, said moving system being actuated by current flow in one of said windings to engage the contact arm with the respective contacts, and means including said contact arm and contacts for selectively energizing the second winding to displace said moving system further in that direction which brought the contact arm into engagement with a contact to complete an energizing circuit for the second winding, means operable upon said further displacement of the moving system to open that energizing circuit which resulted in said further displacement, and control means actuated by said moving system upon such further displacement thereof.

10. In a relay system, a magnet having spaced poles, a moving system pivotally mounted between said poles and including a contact arm and a pair of windings, one of said windings being a power winding and the other a sensitive winding for initiating movement of said moving system, a pair of contacts alternately engageable by said contact arm in response to said initial movement of said moving system, a pair of alternative energizing circuits for said power winding including said contact arm and the respective contacts, a switch operator operable by said contact arm in response to an energization of said power winding, and a switch included in each of said energizing circuits and operable by said switch operator to open position to break the respective energizing circuits when said switch operator is moved by said power winding as a result of the completion of an energizing circuit.

11. A relay system as claimed in claim 10, in combination with a load circuit switch operable by said switch operator when the same is moved in one direction upon the completion of an energizing circuit for said power winding.

12. In a relay, a pair of load circuit switches biased towards open position, a switch operator for alternatively closing said switches, a relay including a contact arm for moving said operator between two limiting positions to close said switches, a sensitive winding and a power winding included in said moving system, and means including a pair of contacts and said contact arm for completing a pair of energizing circuits for said power winding, said system being movable by current flow in said sensitive winding to engage said contact arm alternatively with said contacts.

13. A relay as claimed in claim 12, wherein said contacts are mounted upon said switch operator.

ANTHONY H. LAMB.

CERTIFICATE OF CORRECTION.

Patent No. 2,042,109.  May 26, 1936.

ANTHONY H. LAMB.

It is hereby certified that error appears in the printed specification of the above numbered patent requiring correction as follows: Page 2, second column, line 74, claim 3, before the article "a" insert of; and that the said Certificate should be read with this correction therein that the same may conform to the record of the case in the Patent Office.

Signed and sealed this 1st day of September, A. D. 1936.

Leslie Frazer

Acting Commissioner of Patents.

(Seal)